United States Patent
Wood (10) Patent No.: US 7,262,912 B2
(45) Date of Patent: Aug. 28, 2007

(54) FRONT-PROJECTION SCREENS INCLUDING REFLECTING LAYERS AND OPTICALLY ABSORBING LAYERS HAVING APERTURES THEREIN, AND METHODS OF FABRICATING THE SAME

(75) Inventor: Robert L. Wood, Apex, NC (US)

(73) Assignee: Bright View Technologies, Inc., Morrisville, NC (US)

( * ) Notice: Subject to any disclaimer, the term of this patent is extended or adjusted under 35 U.S.C. 154(b) by 0 days.

(21) Appl. No.: 11/386,649

(22) Filed: Mar. 22, 2006

(65) Prior Publication Data

US 2006/0164729 A1  Jul. 27, 2006

Related U.S. Application Data

(63) Continuation-in-part of application No. 11/053,998, filed on Feb. 9, 2005.

(60) Provisional application No. 60/664,489, filed on Mar. 23, 2005, provisional application No. 60/544,036, filed on Feb. 12, 2004.

(51) Int. Cl.
G03B 21/56 (2006.01)
G03B 21/60 (2006.01)

(52) U.S. Cl. ............... 359/459; 359/455; 359/443; 359/619

(58) Field of Classification Search ........ 359/454–456, 359/443, 459, 619
See application file for complete search history.

(56) References Cited

U.S. PATENT DOCUMENTS

| | | | | |
|---|---|---|---|---|
| 2,991,693 A | * | 7/1961 | MacNeille | 359/455 |
| 4,172,219 A | | 10/1979 | Deml et al. | 219/121.6 |
| 5,096,278 A | * | 3/1992 | Yoshioka et al. | 359/459 |
| 5,361,163 A | * | 11/1994 | Matsuda et al. | 359/452 |
| 6,023,369 A | * | 2/2000 | Goto | 359/443 |
| 6,597,501 B2 | * | 7/2003 | Lambert et al. | 359/449 |
| 6,788,460 B2 | | 9/2004 | Knox et al. | 359/456 |
| 6,816,306 B2 | | 11/2004 | Freese et al. | 359/456 |
| 6,829,086 B1 | * | 12/2004 | Gibilini | 359/453 |
| 6,829,087 B2 | | 12/2004 | Freese et al. | 359/455 |
| 6,891,672 B2 | * | 5/2005 | Whitehead et al. | 359/443 |
| 6,967,779 B2 | | 11/2005 | Fadel et al. | 359/619 |
| 7,055,967 B2 | * | 6/2006 | Bierhuizen | 353/98 |
| 2003/0206342 A1 | | 11/2003 | Reed et al. | 359/460 |
| 2005/0058947 A1 | | 3/2005 | Rinehart et al. | 430/321 |
| 2005/0058948 A1 | | 3/2005 | Freese et al. | 430/321 |
| 2005/0058949 A1 | | 3/2005 | Wood et al. | 430/321 |

OTHER PUBLICATIONS

International Search Report and Written Opinion for PCT/US06/10443; date of mailing Jan. 5, 2007.

* cited by examiner

*Primary Examiner*—W. B. Perkey
*Assistant Examiner*—Magda Cruz
(74) *Attorney, Agent, or Firm*—Myers Bigel Sibley & Sajovec PA (57) ABSTRACT

A front-projection screen can include a substrate having first and second opposing sides with an array of optical microstructures on the first side of the substrate and an image reflecting layer on the second side of the substrate opposite the array of optical microstructures. An optically absorbing layer is located between the image reflecting layer and the array of optical microstructures, the optically absorbing layer includes an array of apertures therein exposing portions of the image reflecting layer therethrough.

26 Claims, 6 Drawing Sheets

FRONT-PROJECTION SCREENS INCLUDING REFLECTING LAYERS AND OPTICALLY ABSORBING LAYERS HAVING APERTURES THEREIN, AND METHODS OF FABRICATING THE SAME

CROSS-REFERENCE TO RELATED APPLICATIONS

This application is a Continuation-In-Part (CIP) of U.S. patent application Ser. No. 11/053,998; filed Feb. 9, 2005, entitled Microstructures for Producing Optical Devices, Sieves, Molds, and Sensors and Methods for Replicating Same, which itself claims priority from U.S. Provisional Patent Application No. 60/544,036; Filed Feb. 12, 2004; entitled Microlens Arrays with Aperture Masks Having Randomized Apertures and Methods of Fabricating Same, and also claims the priority of U.S. Provisional Patent Application No. 60/664,489; filed Mar. 23, 2005, entitled Reflective Microlens Screens Including Light Absorbing and Recycling Layers with Apertures Therein, and Methods of Fabricating Same, the entire disclosures of which are incorporated herein by reference.

BACKGROUND

Microlens arrays are used in many applications where gathering light from a source and then directing it to various locations and at various angles is desirable. Such applications include computer displays, screens for projection televisions, illumination devices and other applications. When coated with reflective materials, such arrays can function as retroreflectors, reflecting light from a source back in the direction from which it entered the material. The array can include an aperture mask which only permits light to pass through the array in certain directions and which absorbs ambient light which would otherwise reflect off of the surface of the array and potentially degrade the contrast of the optical system. Such masks with apertures may be conventionally formed at the points where the microlenses focus paraxial radiation.

Conventional techniques for creating microlens arrays with aperture masks may involve fabrication of the arrays on suitable substrates which are or can be coated with appropriate radiation absorbing mask materials. High intensity radiation is then directed through the lenses and focused by them. If the structure of the lens array, substrate and mask has been designed so that the focal points of the lens array are at or near the mask layer, the radiation can form apertures in the mask at these focal points. See, for example, U.S. Pat. No. 4,172,219 to Deml et al., entitled Daylight Projection Screen and Method and Apparatus for Making the Same and U.S. Pat. No. 6,967,779 to Fadel et al., entitled Micro-Lens Array With Precisely Aligned Apertures Mask and Methods of Producing Same.

The design and manufacture of front projection screens may present design and manufacturing challenges. In particular, it may be desirable to provide high gain, high contrast screens for use with data projectors to exploit emerging opportunities in the home theater market and/or for other applications. Existing commercial screens are generally white or gray matted finish and may produce poor contrast, poor color saturation, and/or washed out black rendering under normal ambient lighting. These screens may also lack the ability to differentiate between projector light, which contains the desired image information, and ambient light, which contains light that can wash-out the image.

SUMMARY

Embodiments according to the invention can provide front-projection screens including reflecting layers and optically absorbing layers having apertures therein, and methods of fabricating the same. Pursuant to these embodiments, a front-projection screen can include a substrate having first and second opposing sides with an array of optical microstructures on the first side of the substrate and an image reflecting layer on the second side of the substrate opposite the array of optical microstructures. An optically absorbing layer is located between the image reflecting layer and the array of optical microstructures, where the optically absorbing layer includes an array of apertures therein exposing portions of the image reflecting layer therethrough.

In other embodiments according to the invention, a front-projection screen includes a substrate having first and second opposing sides with an array of optical microstructures on the first side of the substrate and an optically absorbing layer on the second side of the substrate, where the optically absorbing layer includes an array of apertures therein. An image reflecting layer is directly on the optically absorbing layer opposite the array of optical microstructures, where the image reflecting layer includes portions that are exposed through the array of apertures.

In other embodiments according to the invention, a front-projection screen includes a substrate having first and second opposing sides with an array of optical microstructures on the first side of the substrate and an optically absorbing layer on the second side of the substrate, where the optically absorbing layer including a first array of apertures therein. An image recycling layer is directly on the optically absorbing layer opposite the array of optical microstructures, where the image recycling layer includes reflective portions facing away from the array of optical microstructures and having a second array of apertures therein and an image reflecting layer is spaced-apart from the image recycling layer by a gap.

In other embodiments according to the invention, a front-projection screen includes a substrate having first and second opposing sides with an array of optical microstructures on the first side of the substrate and an optically absorbing layer on the second side of the substrate, where the optically absorbing layer includes a first array of apertures therein. An image recycling layer is directly on the optically absorbing layer opposite the array of optical microstructures, where the image recycling layer includes reflective surfaces facing away from the array of optical microstructures and has a second array of apertures therein in registry with the first array of apertures. An image refracting layer includes an array of refracting microstructures thereon facing the reflective surfaces of the image recycling layer and separated therefrom by a first gap. An image reflecting layer is facing the image refracting layer and is spaced-apart therefrom by a second gap.

In other embodiments according to the invention, a front-projection screen includes a microlens array and a light absorbing layer that is closely spaced apart from the microlens array. A light recycling layer is on the light absorbing layer opposite the microlens array and the light absorbing layer and the light recycling layer both including an array of apertures therein that extend therethrough. A light reflection layer is spaced apart from the light recycling layer opposite the microlens array.

In other embodiments according to the invention, a front-projection screen includes an image recycling layer having a reflective surface and including apertures therein and an image reflecting layer facing the reflective surface of the light recycling layer. In other embodiments according to the invention, a front-projection screen includes an array of optical microstructures spaced apart from an optically blocking pattern through which portions of an image reflecting layer therebeneath are exposed.

In other embodiments according to the invention, a method of providing an image from a front-projection screen includes refracting first incoming light impinging on the screen from a first direction relative to the screen toward an exposed portion of an image reflecting layer in the screen to provide reflected light. Second incoming light impinging on the screen from a second direction relative to the screen is refracted toward an optically absorbing pattern in the screen to absorb the second incoming light. The reflected light is refracted in a third direction toward a front of the screen configured to face a viewer.

In other embodiments according to the invention, a method of forming a front projection screen includes forming an array of optical microstructures on a first side of a substrate and forming an optically absorbing layer on a second side of the substrate opposite the first side. Laser light is impinged through the array of optical microstructures onto portions of the optically absorbing layer to form an array of apertures thereat. An image reflecting layer is formed on the optically absorbing layer.

DESCRIPTION OF EMBODIMENTS ACCORDING TO THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, regions, steps, operations, elements, and/or components, but do not preclude the presence or addition of one or more other features, regions, steps, operations, elements, components, and/or groups thereof.

It will be understood that when an element such as a layer or region is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, materials, regions, layers and/or sections should not be limited by these terms. These terms are only used to distinguish one element, material, region, layer or section from another element, material, region, layer or section. Thus, a first element, material, region, layer or section discussed below could be termed a second element, material, region, layer or section without departing from the teachings of the present invention. Moreover, the terms "front" and "back" may be used herein to describe opposing outward faces of a display screen. Conventionally, the viewing face is deemed the front, but the viewing face may also be deemed the back, depending on orientation. Finally, the terms "horizontal" and "vertical" indicate specific orientations based upon the ultimate orientation of the display.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated, typically, may be rounded. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As described herein below in greater detail, in some embodiments according to the invention, front-projection screens can include optical microstructures positioned on a substrate opposite an optically absorbing layer having apertures therein. Portions of an image reflecting layer are exposed through the apertures so that light projected onto the screen from a predefined direction of incidence can be focused by the array of optical microstructures onto the exposed portions of the image reflecting layer, which is then projected toward the front of the screen. Moreover, light that impinges on the optical microstructures from a direction other than the predefined direction can be provided to the optically absorbing layer (i.e., outside the apertures) so that the light incident on the screen from the undesired direction can be absorbed, thereby reducing the projection of unwanted light toward the front of the screen.

Front-projection screens according to some embodiments of the invention can be configured in conjunction with the position of an image source that projects an image onto the front-projection screen from a particular direction, which is reflected toward the front of the screen. In contrast, light from undesirable sources (such as overhead lighting or other types of ambient light sources) can be absorbed so that the projection of light from these undesired sources can be reduced.

In further embodiments according to the invention, the front-projection screen includes an image recycling layer beneath the optically absorbing layer and including reflective surfaces that face the image reflecting layer that is separated therefrom. The image recycling layer may allow light provided by the optical microstructure through a first aperture to be redirected toward a second aperture spaced apart from the first aperture, which may ultimately be projected toward the front of the screen through the second aperture. Recycling light may improve the gain of the front-projection screen, according to some embodiments of the invention, by allowing the projection of light which may otherwise have been absorbed in a conventional arrangement.

In still further embodiments according to the invention, the front-projection screen can include an image refracting layer positioned between the optically absorbing layer and the image reflecting layer. The image refracting layer can include image refracting microstructures configured to refract light impinging thereon (provided by the image source) as well as configured to refract light reflecting from the image reflecting layer through the apertures to the optical microstructures toward the front of the screen. The image refracting layer may thereby be configured to refract light provided by the image source from a predefined direction and, further, to refract the reflected image toward viewers.

Various embodiments of the invention will now be illustrated with respect to FIGS. 1-4. These embodiments shall be regarded as merely illustrative and shall not be construed as limiting the invention. Moreover, the embodiments described and illustrated herein may be combined in various combinations and subcombinations.

Figure 1:
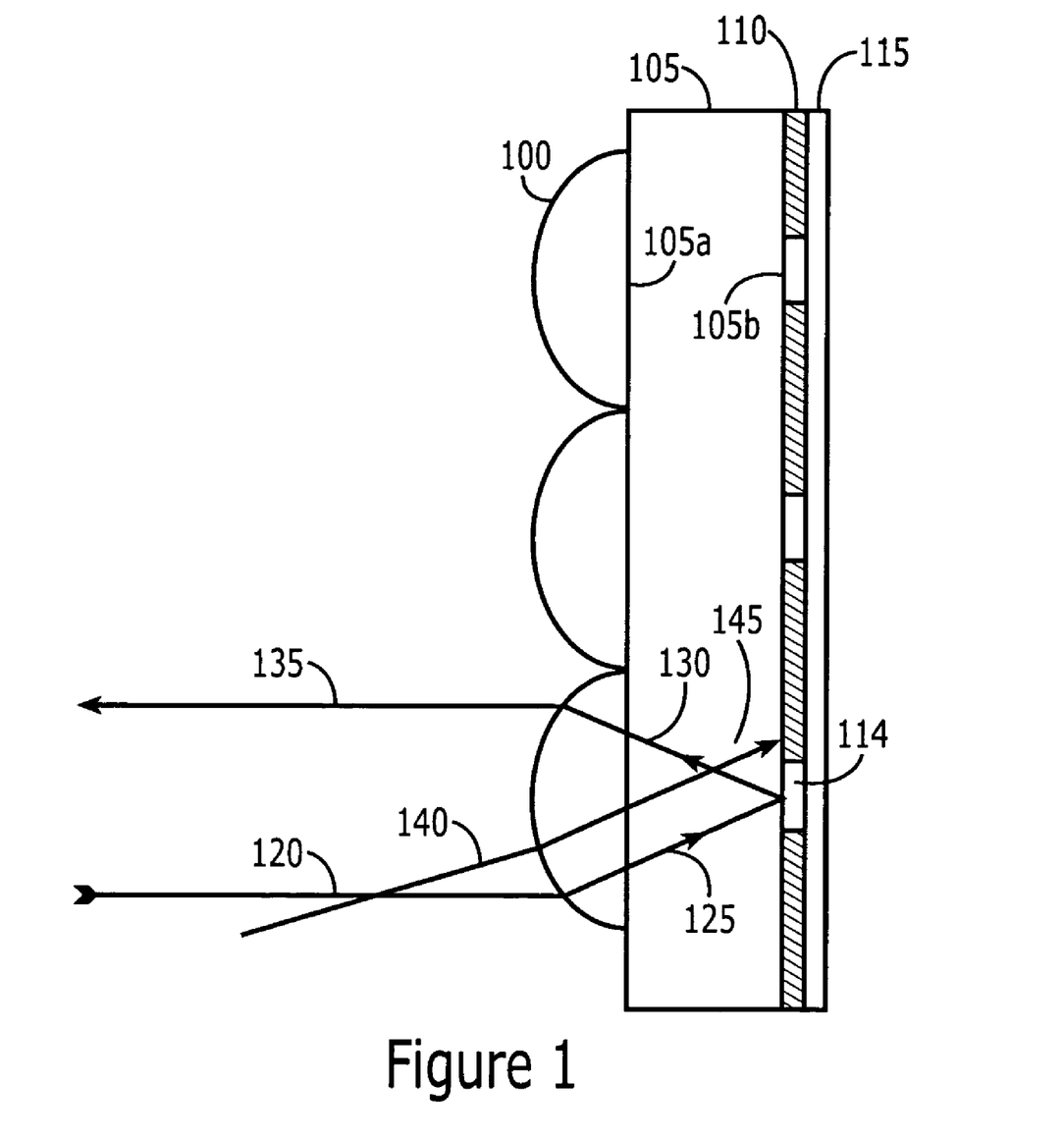
FIGS. 1-6 are cross sectional views illustrating front-projection screens including optically absorbing and reflecting layers according to some embodiments of the invention.

FIG. 1 is a cross-sectional view of a front-projection screen according to some embodiments of the present invention from structural and optical perspectives. Referring to FIG. 1, a substrate 105 includes first and second opposing sides 105a-105b respectively. An array of optical microstructures 100 is provided on the first side 105a of the substrate 105. In some embodiments according to the invention, the substrate 105 is integrated with the optical microstructures 100, and may be embodied as the base of the optical microstructures 100.

Although the term "arrays" is used herein to describe arrangements of various microstructures (such as optical microstructures and refracting microstructures), it will be understood that "arrays" of microstructures can refer to less than all of the microstructures on the screen. For example, in some embodiments according to the invention, a first array of microstructures can be located in one region of the screen and a second array of microstructures can be located in a second region of the screen. Moreover, the first and second arrays can include microstructures that are different from one another or are the same but oriented differently.

An optically absorbing layer 110, including an array of apertures 114 therein, is provided on the second side 105b of the substrate 105. The apertures 114 are in registry with the array of optical microstructures 100. For example, in some embodiments, a respective aperture 114 is centered (aligned) on a respective axis of a respective optical microstructure 100. In other embodiments according to the invention, a respective aperture 114 may be offset from a respective axis. Multiple apertures 114 per optical microstructure 100 may also be provided. Offset and/or multiple apertures are described, for example, in application Ser. No. 11/053,998, filed Feb. 9, 2005, entitled Microstructures For Producing Optical Devices, Sieves, Molds and/or Sensors, And Methods For Replicating And Using Same, to Fadel et al., and assigned to the assignee of the present invention, the disclosure of which is hereby incorporated herein by reference in its entirety as if set forth fully herein. The apertures 114 may be of any shape, including circular, ellipsoidal, polygonal and/or elongated (striped).

In some embodiments of the invention, the array of optical microstructures 100 is an array of horizontally extending lenticular microlenses, such as cylindrical section microlenses. The horizontally extending lenticular microlenses may be contrasted with conventional vertically extending lenticular microlens arrays that may be used for other display applications. Moreover, in still other embodiments according to the invention, the geometry of the optical microstructures 100 may be optically weakened to create larger apertures 114 in the optically absorbing layer 110.

An image reflecting layer 115 is located on the optically absorbing layer 110, opposite the optical microstructures 100, so that portions of the image reflecting layer 115 are exposed through the apertures 114. Accordingly, light 120 impinged on the array of optical microstructures 100 from a predefined direction is refracted through the apertures 114 as refracted light 125. The refracted light 125 is reflected by the exposed portions of the image reflecting layer 115 to provide reflected light 130 back toward the optical microstructures 100. The reflected light 130 is again refracted by the array of optical microstructures 100 to provide projected light 135 based on the light 120 provided by the image source. As shown in FIG. 1, light 140 that is impinged upon the array of optical microstructures 100 from a direction other than the predefined direction is refracted to provide refracted light 145 that is absorbed by the optically absorbing layer 110 so as to reduce the projection of light impinged upon the screen from sources other than the predefined image source.

Optical microstructures 100 according to some embodiments of the invention as illustrated in, for example, FIG. 1 may be formed by microreplicating a layer including an array of cylindrical or lenticular lens-like projections on one side of a 50 μm thick polyester base substrate 105. In some embodiments according to the invention, the substrate 105 can be a polycarbonate film, acrylic film, acetate film and glass, among others. Individual convex lens-like projections may be approximately 80 m wide and about 50 m in height. The lens-like projections may be replicated from a master using a photopolymer with cured refractive index of about 1.50. Lens-like projections may be fabricated as described in published U.S. Patent Application Nos. 2005/0058947; 2005/0058948; 2005/0058949 and/or 2003/0206342; and/or U.S. Pat. Nos. 6,967,779; 6,788,460; 6,829,087 and/or 6,816,306, the disclosures of which are hereby incorporated herein by reference in their entireties as if set forth fully herein. The optical microstructures 100 need not be limited to lens-like projections, but may also take many other forms such as prisms and complex polyhedra as well as combinations of shapes. Other techniques and materials may be used for replicating the microstructures. Some of these include injection molding, embossing, calendaring, thermoplastic and thermoset resins, and room temperature vulcanizing one-part and two-part systems.

The optical microstructures 100 can provide a number of separate functions. As described above, one function can be to focus incoming light from an image source through the apertures 114 in the optically absorbing layer 110. Another function can be provided by the shape of the optical microstructures, to determine the distribution of light projected toward the viewer. The shapes may be used to enhance the angle of view in the horizontal direction while limiting the angle of view in the vertical direction. The shape may thereby determine the gain of the screen. Yet another function of the optical microstructures may be to provide texture on the front surface of the screen that can reduce front-surface reflections, thereby acting as an anti-glare layer and allowing improved screen contrast.

The optical microstructures 100 may be any shape, size, or configuration that causes light impinging on the screen from a predefined direction to converge to a convergence zone beyond the optical microstructures 100. The size of the optical microstructures 100 may be small enough such that individual structures are smaller than the size of individual image pixels projected from the image source. The shape of the optical microstructures 100 may be constant and/or may vary across the surface of the screen, and may be lenticular, spherical, aspherical, anamorphic, prism-shaped, pyramidal shape, combinations and subcombinations thereof and/or other shapes.

The optically absorbing layer 110 may be fabricated of any material that absorbs visible light such as, for example, carbon, pigments, inks, paints, metals, metal-containing compounds, combinations or subcombinations thereof and/or other materials. The apertures 114 may be formed in the optically absorbing layer 110 by, for example, illuminating the optical microstructures 100 with a laser having sufficient intensity and wavelength to cause local ejection of the optically absorbing layer 110 in the convergence zones, as was described in the above-cited Deml et al. patent. The laser illumination may be arranged such that laser light falls in a direction normal to the plane of the optical microstructure array 100 or at some other angle, depending on the predefined angle of illumination of the image source. The laser illumination angle may match the angle at which the light from the image source is provided to the screen in operation. Non-ablative processes also may be used. A nonablative process for fabricating an optically absorbing layer is described in U.S. Pat. No. 6,967,779 to Fadel et al., entitled Micro-Lens Array With Precisely Aligned Apertures Mask and Methods of Producing Same, assigned to the Assignee of the present invention, the disclosure of which is hereby incorporated herein by reference in its entirety as if set forth fully herein.

The image reflecting layer 115 may include a reflective surface, such as a metallic film, a dielectric high-reflection coating, a high-reflectivity paint or ink and/or other suitable materials. The image reflecting layer 115 may provide diffuse or specular reflectance or may provide some combination of diffuse and specular reflectance. In some embodiments according to the invention, the image reflecting layer 115 includes a thin layer of aluminum on, for example, a transparent plastic sheet, or a thin aluminum layer directly on the optically absorbing layer 110. In some embodiments according to the invention, the image reflecting layer 115 includes a layer of white paint applied to the surface of the optically absorbing layer 110. The diffusivity of the image reflecting layer 115 can modify the gain of the screen. For example, a diffuse reflector may produce lower gain and higher view angle than a specular reflector.

Figure 2:
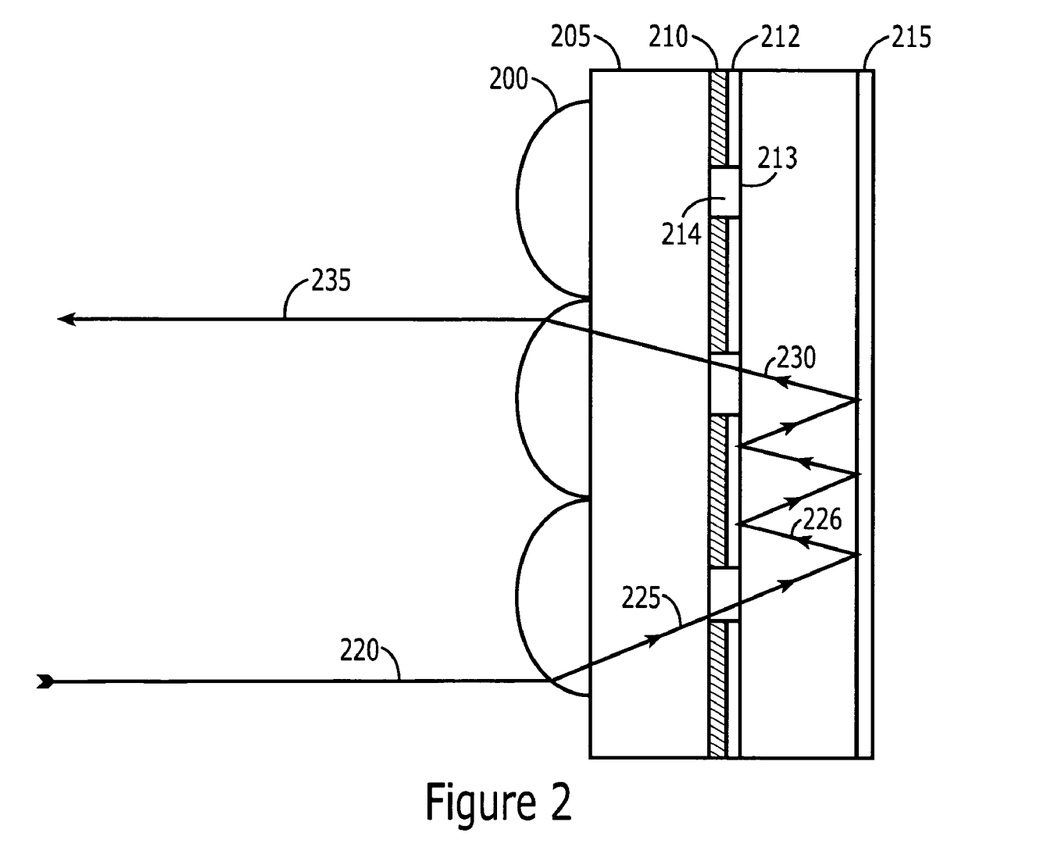

Referring to FIG. 2, a front-projection screen according to some embodiments of the invention includes an array of optical microstructures 200 on a first side of a substrate 205. An optically absorbing layer 210 is on an opposing second side of the substrate 205, the optically absorbing layer 210 having apertures 214 therein. An image recycling layer 212 is located on the optically absorbing layer 210, the image recycling layer 212 having apertures 213 formed therein, which are aligned to the apertures 214. The image recycling layer 212 includes reflective surfaces that face away from the array of optical microstructures 200 and face an image reflecting layer 215 which is separated therefrom by a gap.

Accordingly, the front-projection screen of FIG. 2 is configured to receive light 220 projected toward the screen by an image source in a predefined direction. The light 220 is directed as light 225 through a first set of aligned apertures 214/213 to impinge on the image reflecting layer 215. The light 225 is reflected from the image reflecting layer 215 as reflected light 226 that impinges on the reflective surface of the image recycling layer 212 to provide redirected light back toward the image reflecting layer 215.

In turn, the image reflecting layer 215 reflects the redirected light 226 back toward the image recycling layer 212 so that ultimately light 230 may pass through a second set of apertures 214/213 toward the front screen through the array of optical microstructures 200 to provide projected light 235 from the front of the screen. Accordingly, front-projection screens according to some embodiments of the invention as illustrated, for example in FIG. 2, can receive light through a first aperture which is recycled/reflected from the screen through a second aperture that is spaced apart from the first aperture. Light which may otherwise have been absorbed by the optically absorbing layer 210 can be recycled through a series of reflections to be projected from the screen via a different aperture. The image recycling layer 212 can be any material capable of reflecting visible light, such as a metallic layer of aluminum and/or silver, a dielectric layer configured to reflect visible wavelengths, combinations and subcombinations thereof and/or other materials.

The image recycling layer 212 may be deposited directly on the optically absorbing layer 210. The apertures 214/213 in the optically absorbing layer 210 and image recycling layer 212 respectively may be formed concurrently by, for example, illuminating the array of optical microstructures 200 with laser light having sufficient intensity and wavelength to cause a simultaneous local ejection of the optically absorbing and recycling materials from the portions thereof upon which the laser light is impinged by the array of optical microstructures 200.

The laser light may be impinged from a direction that is normal to the plane of the array of optical microstructures 200 or at another angle, depending on the predefined angle at which the image projection source will provide light to the front-projection screen. An ablative and/or a nonablative process may be used as described in the above cited U.S. Pat. No. 6,967,779 to Fadel et al.

Figure 3:
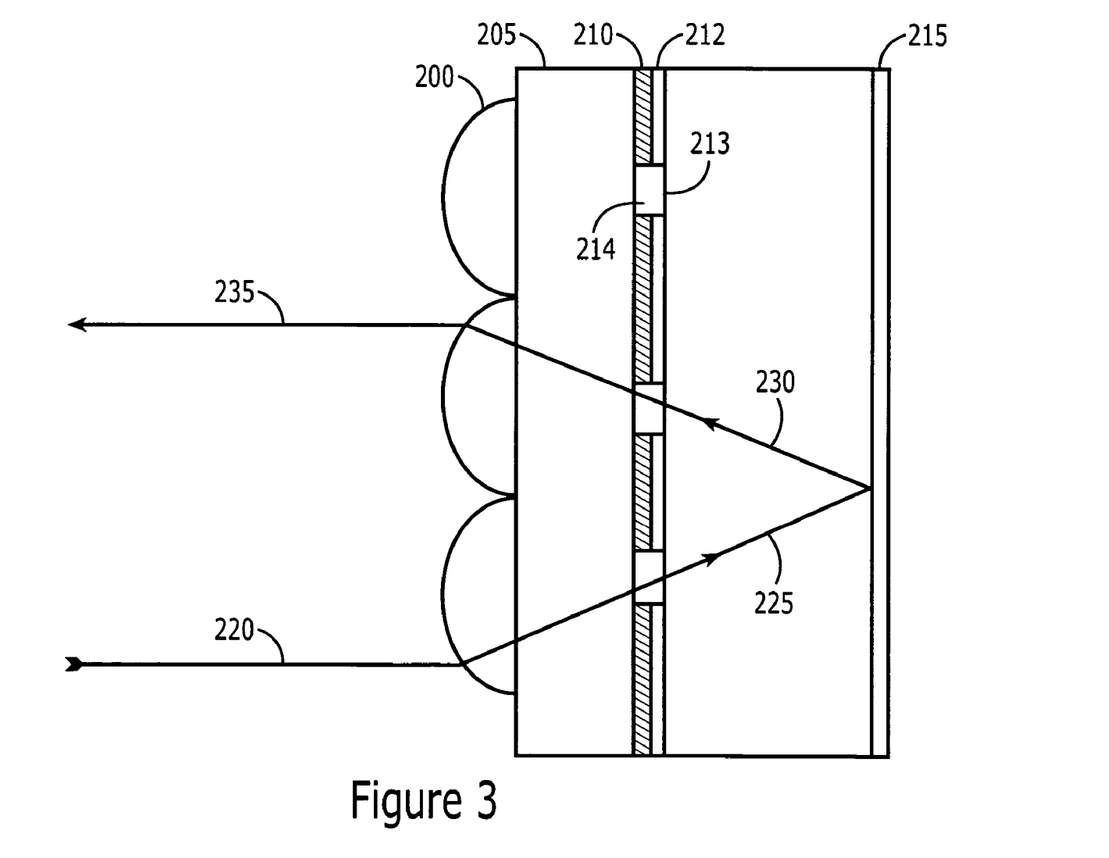

Referring to FIG. 3, in some embodiments according to the invention, it will be understood that the spacing between the image reflecting layer 215 and the optically absorbing layer 210/image recycling layer 212, along with the geometry of the array of optical microstructures 200, can be such that the light 220 provided by the image source in the predefined direction passes through the apertures 214/213 as light 225 to impinge on the image reflecting layer 215. The image reflecting layer 215 reflects the light 225 as reflected light 230 through adjacent aligned apertures 214/213 to the optical microstructures, which is directed outward from the screen as projected light 235. Accordingly, in some embodiments according to the invention, much of the light provided by the image source may be projected through an adjacent aperture without the use of the image recycling layer 212.

Figure 4:
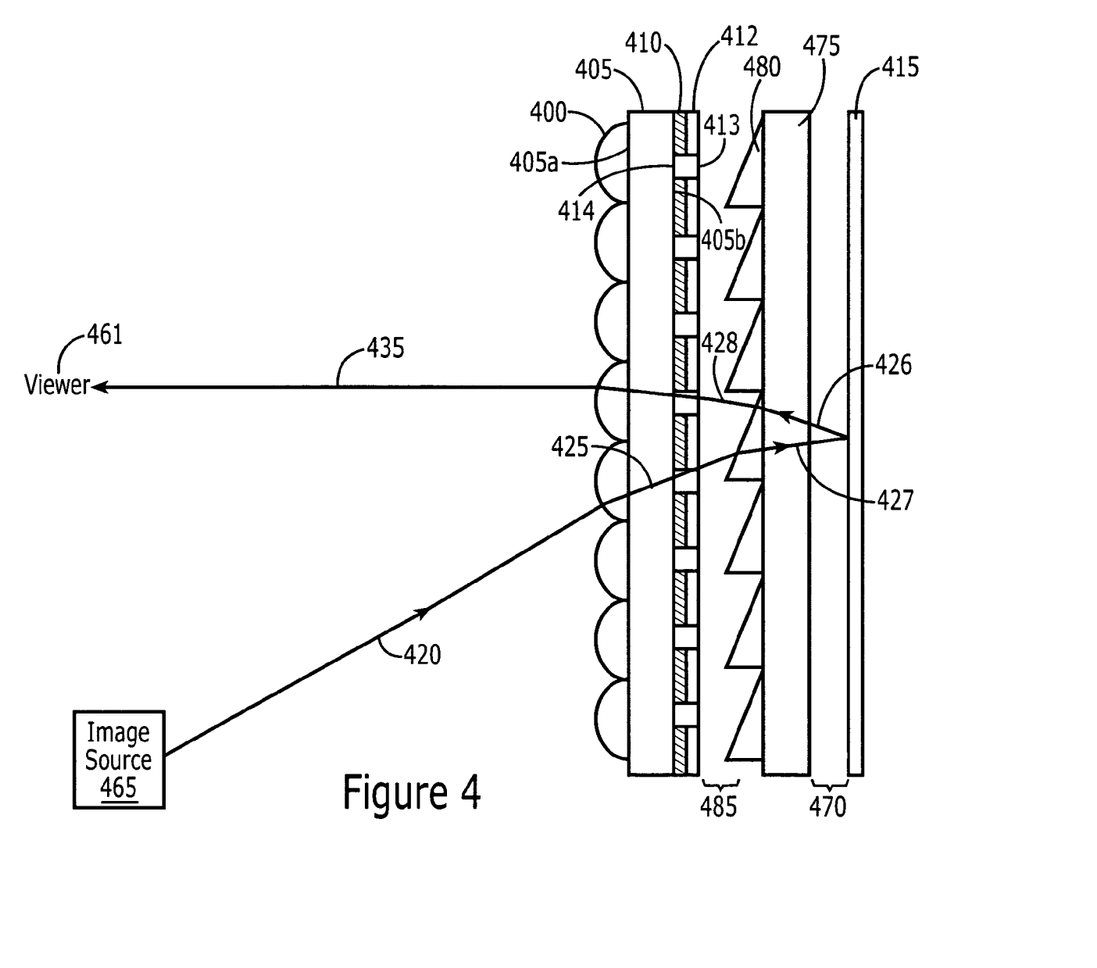

According to FIG. 4, an image source 465 is positioned off-axis relative to a viewer position 461 to provide light 420 to a front-projection screen according to some embodiments of the invention. The front-projection screen includes an array of optical microstructures 400 on a first side 405a of the substrate 405 and an optically absorbing layer 410 and image recycling layer 412 on a second side 405b of the substrate opposite the first side. As shown in FIG. 4, the optically absorbing layer 410 and image recycling layer 412 include respective aligned apertures 414/413 therein.

An image refracting layer includes an array of image refracting structures 480 formed on a refracting substrate 475. The image refracting layer is positioned between the optically absorbing layer 410/image recycling layer 412 and an image reflecting layer 414, both of which are separated from the image refracting layer by respective gaps 485/470.

The front projection screen is configured to provide the light 420 through the array of optical microstructures 400 through the respective apertures 414/413 as light 425 to the refracting microstructures 480. The refracting microstructures 480 refract the light 425 to provide light 427 through the refracting substrate 475 to the image reflecting layer 415. The image reflecting layer 415 reflects the light 427 to provide reflected light 426 back through the refracting substrate 475 and refracting microstructures 480 to the array of optical microstructures 400 through separate aligned apertures 414/413 as light 428. The light 428 is directed toward a viewer position 461 by the array of optical microstructures 400 as projected light 435.

Accordingly, the image refracting layer can be configured to refract light directed toward the front projection screen from a particular direction and further configured to refract the reflected light toward the viewer position through the array of optical microstructures to control the direction, gain and/or distribution of light projected to the viewing position 461.

It will be understood that the image refracting layer may include any at least partially non-absorptive layer that causes deviation of light from its original path. Structures that can produce this deviation may include lenses, prisms, gradings, holograms and/or other optical structures. These structures may be produced, for example, using published application numbers US 2005/0058947 A1, U.S. 2005/0058948 A1 and/or US 2005/0058949 A1, cited above, and/or using other techniques. For example, the refracting microstructures may be prism-shaped projections arranged side by side on the surface of a transparent plastic substrate (as the refracted substrate 475). It will be further understood that the image recycling layer 412 shown in FIG. 4 can provide for the recycling of light which otherwise would have impinged on the optically absorbing layer to thereby provide the same advantages described above in reference to FIGS. 2 and 3.

In some embodiments according to the invention, the image refracting layer can be combined with, or fabricated as part of, the image reflecting layer 415. In some embodiments according to the invention, the gap between the image reflecting layer 415 and the image recycling layer 412 can be selected to provide enhanced reflectivity of the screen, as illustrated in FIG. 3.

Figure 5:
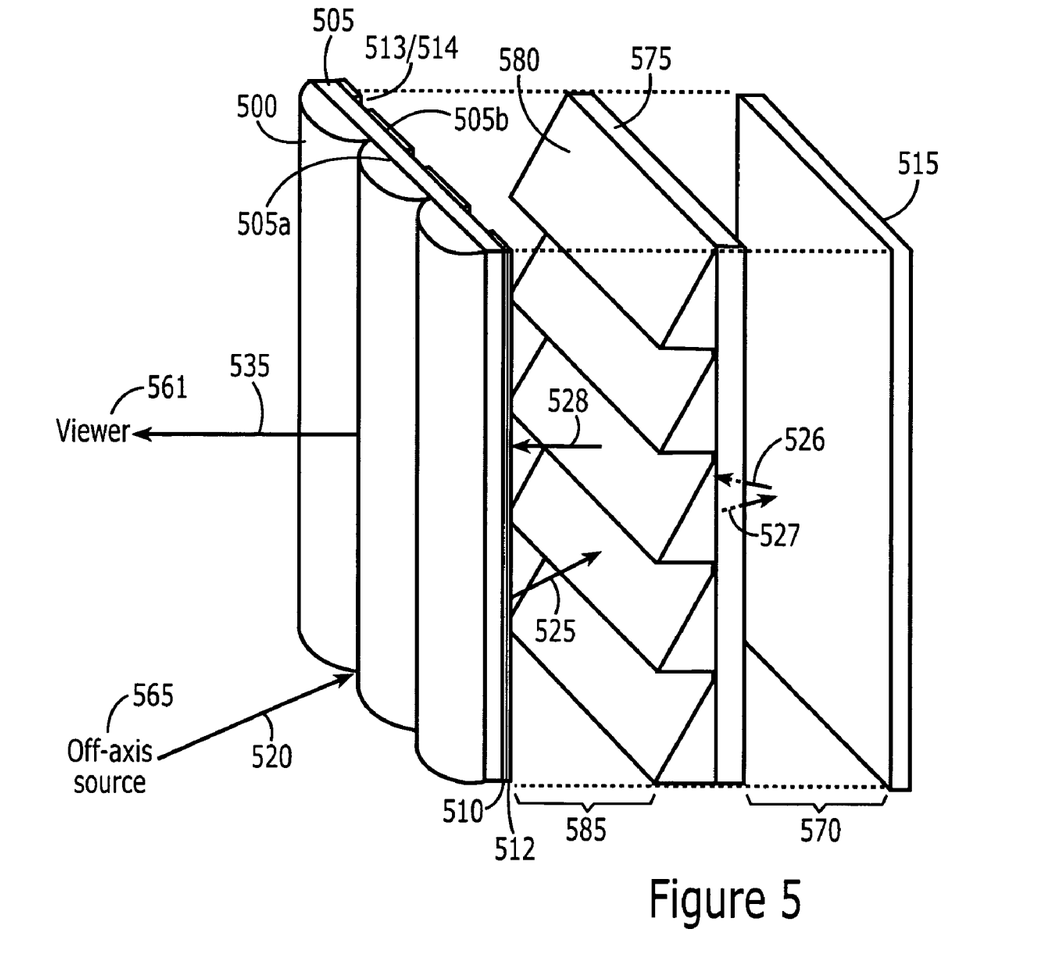

According to FIG. 5, an image source 565 is positioned off-axis relative to a viewer position 561 to provide light 520 to a front-projection screen according to some embodiments of the invention. The front-projection screen includes an array of vertically oriented optical microstructures 500 on a first side 505a of the substrate 505 and an optically absorbing layer 510 and image recycling layer 512 on a second side 505b of the substrate opposite the first side. As shown in FIG. 5, the optically absorbing layer 510 and image recycling layer 512 include respective aligned vertically oriented apertures 514/513 therein.

An image refracting layer includes an array of horizontally oriented image refracting structures 580 formed on a refracting substrate 575. The image refracting layer is positioned between the optically absorbing layer 510/image recycling layer 512 and an image reflecting layer 515, both of which are separated from the image refracting layer by respective gaps 585/570. Accordingly, in some embodiments according to the invention, the vertically oriented apertures 514/513 are oriented orthogonal to the array of horizontally oriented image refracting structures 580.

The front projection screen is configured to provide the light 520 through the array of vertically oriented optical microstructures 500 through the respective vertically oriented apertures 514/513 as light 525 to the horizontally oriented refracting microstructures 580. The horizontally oriented refracting microstructures 580 refract the light 525 to provide light 527 through the refracting substrate 575 to the image reflecting layer 515. The image reflecting layer 515 reflects the light 527 to provide reflected light 526 back through the refracting substrate 575 and horizontally oriented refracting microstructures 580 to the array of vertically oriented optical microstructures 500 through separate vertically oriented aligned apertures 514/513 as light 528. The light 528 is directed toward a viewer position 561 by the array of vertically oriented optical microstructures 500 as projected light 535.

Accordingly, the horizontally oriented image refracting layer can be configured to refract light directed toward the front projection screen from a particular direction, such as below the viewer position, and further configured to refract the reflected light toward the viewer position through the array of vertically oriented optical microstructures to control the direction, gain and/or distribution of light projected to the viewing position 561.

Figure 6:
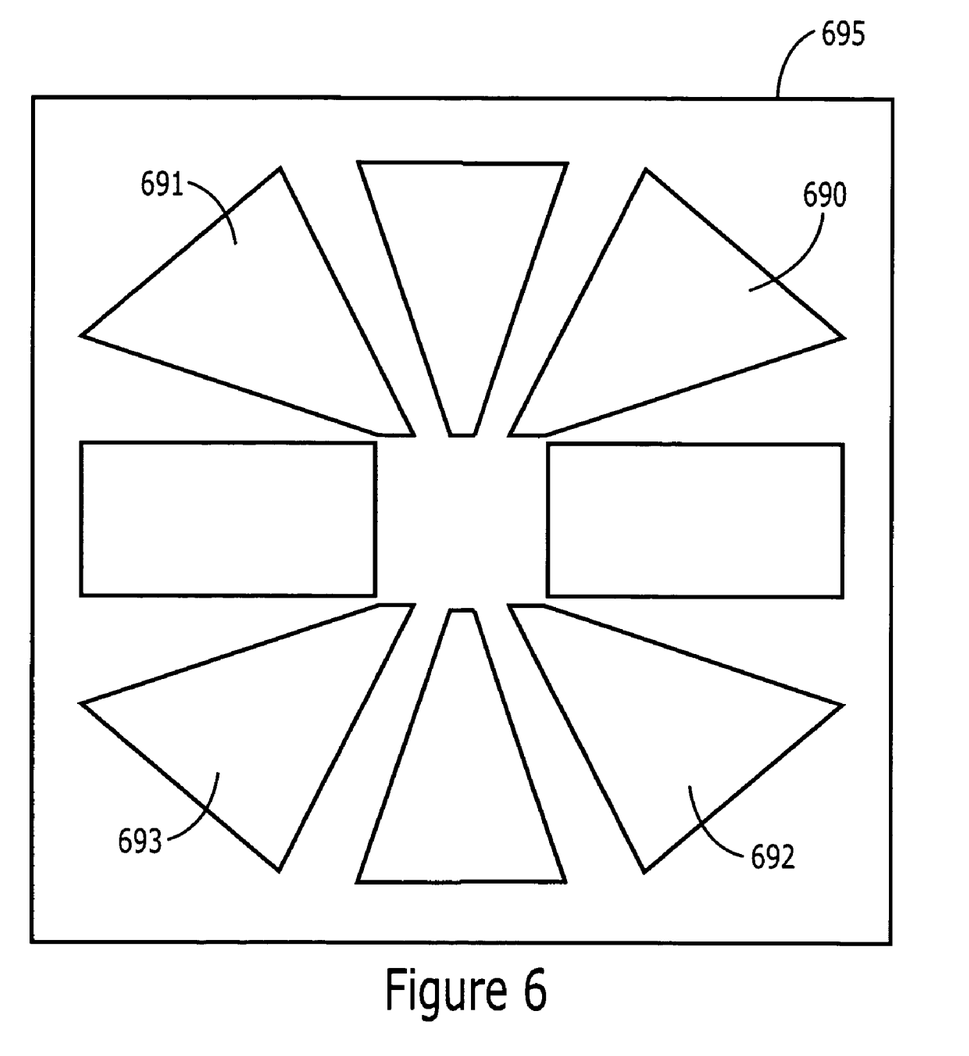

In some embodiments according to the invention, the array of optical microstructures and the array of refracting microstructures are neither horizontally nor vertically oriented on the screen, but rather have an oblique orientation on the screen so that light provided by the image source is refracted toward a viewer independent of the region in which the arrays of microstructures are located. For example, as illustrated in FIG. 6, a screen 695 includes a plurality of arrays of microstructures, such as optical microstructures and refracting microstructures, that are oriented in different directions on the screen 695. The different arrays of microstructures are oriented differently on the screen 695 according to the region of the screen 695 in which they are located. Moreover, the orientations of the different arrays of microstructures can cooperate with one another so that light provided from an image source can be refracted differently to project light toward the viewer. For example, a first array of microstructures 690 is obliquely oriented in a top right region of the screen 695 so that light from an image source is refracted toward a viewer located in front of the screen 695. Furthermore, a second array of microstructures 691 is located in a top left region of the screen 695 and is configured to refract light incident from the image source toward the same viewing position. Furthermore, third and fourth arrays of microstructures 692 and 693 are located in a bottom right region and bottom left region of the screen 695, respectively, to refract light from the image source incident thereon toward the same viewer position. Accordingly, the arrays of microstructures cooperate with one another to refract light toward the same viewing position independent of the different regions of the screen 695 in which the arrays are located.

It will be further understood that the arrays of microstructures described above in reference to FIG. 6 can include both optical microstructures and associated refracting microstructures such as those described above in reference to FIGS. 1-5. For example, the first array of microstructures 690 shown in FIG. 6 can include an array of optical microstructures and an array of associated refracting microstructures each oriented obliquely on the screen 695 such that light incident on the array of optical microstructures passes through associated apertures to the array of refracting microstructures to a respective image reflecting layer for reflection back through the array of refracting microstructures and array of optical microstructures for projection toward the viewer position. Therefore, the array of optical microstructures and the array of refracting microstructures included in the array of microstructure 690 can be oriented orthogonal to one another even though the overall orientation of the array 690 is oblique.

It will be further understood that as used herein the term "obliquely" includes orientations where a major dimension of a microstructure defines an oblique angle (i.e. an angle between 90° and 0°) with the horizontal or vertical dimension of the screen. For example, if a refracting microstructure is described as being obliquely oriented on the screen, the major dimension of the refracting microstructure defines an oblique angle with the horizontal or vertical dimension of the screen.

Although FIG. 6 shows separate arrays of microstructures on the screen, it will be understood that in some embodiments according to the invention, the changes in the orientations between the arrays of microstructures may be continuous so that the changes in orientation between the separate arrays are gradual. Accordingly, the arrays of microstructures shown in FIG. 6 are schematic in nature and are not intended to limit the orientations of the separate arrays to those shown. Moreover, the orientations of different microstructures within a particular array may be different to further promote the refraction of light toward the viewer position. For example, the orientation of microstructures within the array may vary based on the spacing between the particular microstructure and the center of the screen 695. In addition, the shape of the refracting microstructures within each array may also vary based on the spacing between the particular microstructure and the center of the screen 695 so that light is refracted toward the view position regardless of whether the refracting microstructure is close to the center or close to the edge of the screen 695.

As described herein, in some embodiments according to the invention, front-projection screens can include optical microstructures positioned on a substrate opposite an optically absorbing layer having apertures therein. Portions of an image reflecting layer are exposed through the apertures so that light projected onto the screen from a predefined direction of incidence can be focused by the array of optical microstructures onto the exposed portions of the image reflecting layer, which is then projected toward the front of the screen. Moreover, light that impinges on the optical microstructures from a direction other than the predefined direction can be provided to the optically absorbing layer (i.e., outside the apertures) so that the light incident on the screen from the undesired direction can be absorbed, thereby reducing the projection of unwanted light toward the front of the screen.

Therefore, front-projection screens according to some embodiments of the invention can be configured in conjunction with the position of an image source that projects an image onto the front-projection screen from a particular direction, which is reflected toward the front of the screen. In contrast, light from undesirable sources (such as overhead lighting or other types of ambient light sources) can be absorbed so that the projection of light from these undesired sources can be reduced.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A front-projection screen comprising:
   a substrate having first and second opposing sides;
   an array of optical microstructures on the first side of the substrate;
   an image reflecting layer on the second side of the substrate opposite the array of optical microstructures; and
   an optically absorbing layer, between the image reflecting layer and the array of optical microstructures, the optically absorbing layer including an array of apertures therein exposing portions of the image reflecting layer therethrough, the front-projection screen further comprising:
   an image recycling layer on the optically absorbing layer facing the image reflecting layer.

2. A front-projection screen according to claim 1 wherein light of an image impinged onto the image reflecting layer via a first aperture is reflected onto the image recycling layer; and
   wherein the image recycling layer is configured to re-direct light from the image reflecting layer back toward the image reflecting layer so that the re-directed light passes through a second aperture.

3. A front-projection screen according to claim 1 wherein the image reflecting layer is spaced apart from the optically absorbing layer, the front-projection screen further comprising:
   an image recycling layer on the optically absorbing layer facing the image reflecting layer; and
   an image refracting layer between the image recycling layer and the image reflecting layer comprising an array of refracting microstructures in registry with the array of optical microstructures.

4. A front-projection screen according to claim 3 wherein the image refracting layer is configured to provide first refracted light of an image from an off-axis image source to the image reflecting layer and provide second refracted light of the image from the image reflecting layer to the array of optical microstructures through the array of apertures.

5. A front-projection screen according to claim 4 wherein the refracting microstructures are configured to re-direct light of the image from the off-axis image source to a greater degree than light from the image reflecting layer.

6. A front-projection screen according to claim 3 wherein the image refracting layer comprises a partially non-absorptive layer.

7. A front-projection screen according to claim 3 wherein the refracting microstructures comprise micro-lenses, micro-prisms, micro-gratings, and/or holograms.

8. A front-projection screen according to claim 1 wherein the image reflecting layer comprises a metallic film, a dielectric reflective coating, a reflective paint, and/or a reflective ink.

9. A front-projection screen according to claim 1 wherein the image reflecting layer comprises an aluminum layer directly on an image refracting layer between the image recycling layer and the image reflecting layer, an aluminum layer directly on a transparent plastic sheet, or white paint on the image refracting layer.

10. A front-projection screen comprising:
a substrate having first and second opposing sides;
an array of optical microstructures on the first side of the substrate;
an optically absorbing layer on the second side of the substrate, the optically absorbing layer including a first array of apertures therein;
an image recycling layer directly on the optically absorbing layer opposite the array of optical microstructures, the image recycling layer including reflective portions facing away from the array of optical microstructures and having a second array of apertures therein; and
an image reflecting layer, spaced-apart from the image recycling layer by a gap.

11. A front-projection screen comprising:
a substrate having first and second opposing sides;
an array of optical microstructures on the first side of the substrate;
an optically absorbing layer on the second side of the substrate, the optically absorbing layer including a first array of apertures therein;
an image recycling layer directly on the optically absorbing layer opposite the array of optical microstructures, the image recycling layer including reflective surfaces facing away from the array of optical microstructures and having a second array of apertures therein in registry with the first array of apertures;
an image refracting layer including an array of refracting microstructures thereon facing the reflective surfaces of the image recycling layer and separated therefrom by a first gap; and
an image reflecting layer facing the image refracting layer and spaced-apart therefrom by a second gap.

12. A front-projection screen according to claim 11 wherein the image refracting layer is configured to provide first refracted light of an image from an off-axis image source to the image reflecting layer and provide second refracted light of the image from the image reflecting layer to the array of optical microstructures through the first and second arrays of apertures.

13. A front-projection screen according to claim 12 wherein the refracting microstructures are configured to re-direct the light of the image from the off-axis image source to a greater degree than the light from the image reflecting layer.

14. A front-projection screen according to claim 12 wherein the array of refracting microstructures comprise an array of vertically oriented refracting microstructures on the screen;
wherein the first and second arrays of apertures comprises first and second vertically oriented apertures on the screen; and
wherein the array of refracting microstructures comprises an array of horizontally oriented refracting microstructures on the screen.

15. A front-projection screen according to claim 12 wherein the array of refracting microstructures comprise an array of obliquely oriented refracting microstructures on the screen;
wherein the first and second arrays of apertures comprises first and second obliquely oriented apertures; and
wherein the array of refracting microstructures comprises an array of obliquely oriented refracting microstructures on the screen.

16. A front-projection screen according to claim 15 wherein a major dimension of the array of refracting microstructures having the oblique orientation defines an angle between 0 degrees and 90 degrees with a horizontal or vertical dimension of the screen.

17. A front-projection screen according to claim 16 wherein a degree of refraction provided by the refracting microstructures varies according to a spacing between respective ones of the refracting microstructures and a center of the screen.

18. A front-projection screen comprising:
a substrate having first and second opposing sides;
an array of optical microstructures on the first side of the substrate;
an optically absorbing layer on the second side of the substrate, the optically absorbing layer including a first array of apertures therein;
an image recycling layer directly on the optically absorbing layer opposite the array of optical microstructures, the image recycling layer including reflective surfaces facing away from the array of optical microstructures and having a second array of apertures therein in registry with the first array of apertures;
an image refracting layer including an array of refracting microstructures thereon facing the reflective surfaces of the image recycling layer and separated therefrom by a first gap, including ones of the array of refracting microstructures configured to refract light toward a viewer position independent of respective locations of the ones of the array of refracting microstructures on the screen; and
an image reflecting layer facing the image refracting layer and spaced-apart therefrom by a second gap.

19. A front projection screen comprising:
a microlens array;
a light absorbing layer that is closely spaced apart from the microlens array;
a light recycling layer on the light absorbing layer opposite the microlens array;
the light absorbing layer and the light recycling layer both including an array of apertures therein that extend therethrough; and
a light reflection layer that is spaced apart from the light recyling layer opposite the microlens array.

20. A front-projection screen comprising:
an image recycling layer having a reflective surface and including apertures therein; and
an image reflecting layer facing the reflective surface of the light recycling layer.

21. A front-projection screen according to claim 20 wherein the apertures comprise first apertures, the screen further comprising:
an optically absorbing layer on the image recycling layer opposite the image reflecting layer and including second apertures therein in registry with the first apertures.

22. A method of providing an image from a front-projection screen comprising:

refracting first incoming light impinging on the screen from a first direction relative to the screen toward an exposed portion of an image reflecting layer in the screen to provide reflected light;

refracting second incoming light impinging on the screen from a second direction relative to the screen toward an optically absorbing pattern in the screen to absorb the second incoming light;

refracting the reflected light in a third direction toward a front of the screen configured to face a viewer;

internally reflecting the reflected light inside the screen to provide recycled light; and reflecting the recycled light toward the front of the screen.

23. A method according to claim 22 further comprising:

refracting the reflected recycled light in the third direction.

24. A method of forming a front projection screen comprising:

forming an array of optical microstructures on a first side of a substrate;

forming an optically absorbing layer on a second side of the substrate opposite the first side;

impinging laser light through the array of optical microstructures onto portions of the optically absorbing layer to form an array of apertures thereat; and forming an image reflecting layer on the optically absorbing layer.

25. A method according to claim 24 wherein forming an image reflecting layer on the optically absorbing layer comprises forming the image reflecting layer spaced apart from the optically absorbing layer by a gap; and wherein forming an optically absorbing layer on a second side of the substrate opposite the first side further comprises forming an image recycling layer on the optically absorbing layer including a reflective surface facing the image reflecting layer.

26. A method according to claim 25 further comprising:

forming an image refracting layer between the image recycling layer and the image reflecting layer comprising an array of refracting microstructures in registry with the array of optical microstructures.

* * * * *